Feb. 17, 1925.

A. HORSTMANN 1,526,856

AUTOMOBILE SAFETY SIGNAL

Filed June 3, 1924

INVENTOR
Arthur Horstmann
BY
ATTORNEY

Patented Feb. 17, 1925.

1,526,856

UNITED STATES PATENT OFFICE.

ARTHUR HORSTMANN, OF STATEN ISLAND, NEW YORK.

AUTOMOBILE SAFETY SIGNAL.

Application filed June 3, 1924. Serial No. 717,594.

*To all whom it may concern:*

Be it known that I, ARTHUR HORSTMANN, a citizen of the United States, residing at Staten Island, in the county of Richmond and State of New York, have invented certain new and useful Improvements in Automobile Safety Signals, of which the following is a specification.

This invention relates to a safety signal for automobiles designed to give warning in the event that an attempt is made to steal the automobile, or if an unauthorized person tries to use the automobile, the invention having for an object the provision of a novel and simple device of the above sort.

For further comprehension of the invention, and of the objects and advantages thereof, reference will be had to the following description and accompanying drawing, and to the appended claims in which the various novel features of the invention are more particularly set forth.

Fig. 1 of the drawing is a side view of an automobile showing my improved safety signal applied thereto.

Figure 1:
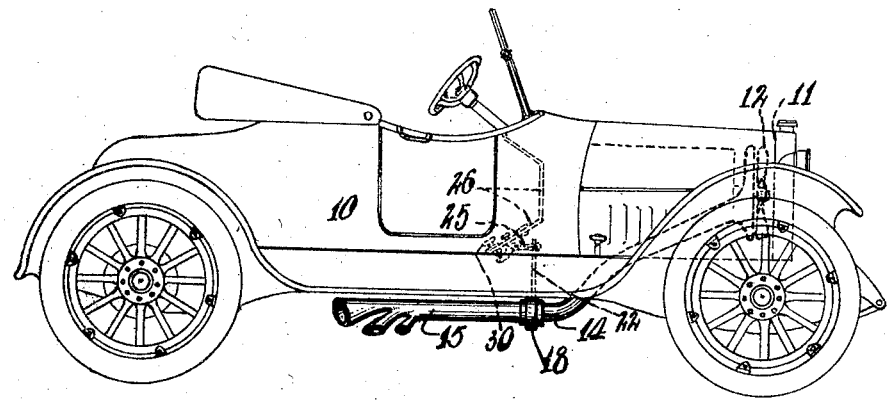
Figure 2:
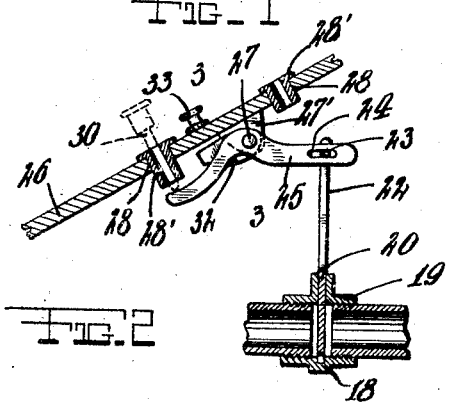
Fig. 2 is a fragmentary longitudinal sectional view showing the signal control means.
Figure 3:
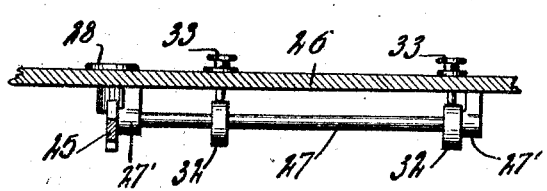
Fig. 3 is a transverse sectional view taken on the line 3—3 of Fig. 2.

Referring now to the drawing the reference numeral 10 indicates generally the body of an automobile, and 11 the usual radiator, behind which is the usual cooling fan 12 driven from the engine in the usual manner. Located with its mouth just to the rear of this fan, so as to be in the path of the blast of air from the fan, is a pipe 14 which leads backwardly and connects to a sounding horn 15 which may be of multiple construction as shown, to give several different sounds and be thereby distinguishable from an ordinary horn.

The pipe 14 is provided with a valve whereby the passage of air therethrough, from the intake end adjacent the fan to the horn 15, is controlled. This valve comprises a flat casing 18 formed on opposite sides with the bosses 19 into which are screwed the ends of adjacent sections of the pipe 14. In this casing 18 is a slidable plate 20 which forms a valve and which is movable to intersect the passage between the two sections of the pipe when the valve is closed, or which may be moved to one side to leave said passage open.

This plate 20 is connected to a stem 22 which extends upward and has a pin 23 fixed on its upper end which engages in a slot 24 in one end of a lever 25 which is fulcrumed between its ends to and under the dashboard 26 of the automobile, this lever being here shown as fixed mounted on the end of a shaft 27 extending transversely under the dashboard and supported by bearing brackets 27' depending from the latter. Formed in the dashboard 26, one above each arm of the lever 25, are a pair of apertures 28 in which may be bushings 28'. By inserting a suitable plunger pin such as 30 into either of these apertures the lever may be moved to open or close the valve, sufficient frictional engagement being provided between the plate 20 and the casing 18 to retain the valve in its opened position.

Upon the shaft 27 I may fix other arms 32, and above these arms I mount in the dashboard plunger pins or push buttons 33 which upon depression swing the shaft 27 and lever 25 to open the valve.

In the use of my improved safety signal the plunger pin 30 may be inserted into the proper aperture 28 when the owner or driver is leaving the automobile and the lever 25 moved to open the valve, the pin 30 being then removed. If an attempt is made to start the engine the rotation of the fan 12 will cause a blast of air to be directed through the open pipe 14 and into the horn 15, causing the latter to sound. When the driver returns the pin 30 is inserted in the other one of the apertures 28 and the lever 25 swung to close the valve.

The buttons 33, as above stated, are permanently in operative position, and in the event that an attempt is made to start the engine when the driver is away and has forgotten to open the valve, the unfamiliar person attempting to start the engine will be liable to step on one of the buttons and so open the valve, which will thus sound when the engine starts.

While I have illustrated and described a preferred embodiment of my invention, it is to be understood that I do not limit myself to the precise construction herein shown, and that various changes and modifications might be made therein without departing from the spirit and scope of the invention as defined in the appended claims.

Having thus described my invention what I claim as new and desire to protect by Let- ters Patent of the United States is as follows:—

1. A safety signal device for automobiles comprising a pipe having one end open and positioned behind the fan of the automobile, a horn on the other end of said pipe, and a valve controlling the passage through the said pipe, and a lever fulcrumed between its ends under the dashboard of the automobile for operating said valve, said dashboard having a pair of apertures therein located above the respective arms of the lever to receive an operating tool for said lever.

2. A safety signal device for automobiles comprising a pipe having one end open and positioned behind the fan of the automobile, a horn on the other end of said pipe, and a valve controlling the passage through the said pipe, and a lever mounted under the dashboard of the automobile for operating said valve, said dashboard having a pair of apertures therein to receive an operating tool for said lever, said operating tool being in the form of a plunger pin adapted to be passed freely through either of said apertures and engage the lever to move the latter between open and closed positions.

3. A safety signal device for automobiles comprising a pipe having one end open and positioned behind the fan of the automobile, a horn on the other end of said pipe, and a valve controlling the passage through the said pipe, and a lever mounted under the dashboard of the automobile for operating said valve, said dashboard having a pair of apertures therein to receive an operating tool for said lever, a rock-shaft on which said lever is fixed, a number of arms fixed to said rock-shaft, and plunger pins mounted in the said dashboard and adapted to bear on the said arms to move the lever to open the said valve.

4. A safety signal device for automobiles comprising a pipe having one end open and positioned behind the fan of the automobile, a horn on the other end of said pipe, and a valve controlling the passage through the said pipe, said valve being in the form of a plate slidable transversely of the pipe, a double armed lever mounted under the dashboard, a stem connecting said valve with said lever, said dashboard having a pair of apertures therein registering with the respective arms of the lever to receive an operating tool for the latter.

In testimony whereof I have affixed my signature.

ARTHUR HORSTMANN.